(12) United States Patent
Ko et al.

(10) Patent No.: US 10,923,126 B2
(45) Date of Patent: Feb. 16, 2021

(54) METHOD AND DEVICE FOR DETECTING VOICE ACTIVITY BASED ON IMAGE INFORMATION

(71) Applicants: Samsung Electronics Co., Ltd., Suwon-si (KR); Korea University Research And Business Foundation, Seoul (KR)

(72) Inventors: Hanseok Ko, Seoul (KR); Sung-soo Kim, Bucheon-si (KR); Taeyup Song, Seoul (KR); Kyungsun Lee, Incheon (KR); Jae-won Lee, Seoul (KR)

(73) Assignees: Samsung Electronics Co., Ltd., Suwon-si (KR); Korea University Research And Business Foundation, Seoul (KR)

( * ) Notice: Subject to any disclaimer, the term of this patent is extended or adjusted under 35 U.S.C. 154(b) by 181 days.

(21) Appl. No.: 15/557,378

(22) PCT Filed: Mar. 19, 2015

(86) PCT No.: PCT/KR2015/002654
§ 371 (c)(1),
(2) Date: Sep. 11, 2017

(87) PCT Pub. No.: WO2016/148322
PCT Pub. Date: Sep. 22, 2016

(65) Prior Publication Data
US 2018/0247651 A1     Aug. 30, 2018

(51) Int. Cl.
*G06K 9/00*     (2006.01)
*G06K 9/46*     (2006.01)
(Continued)

(52) U.S. Cl.
CPC .......... *G10L 15/25* (2013.01); *G06K 9/00281* (2013.01); *G06K 9/00315* (2013.01);
(Continued)

(58) Field of Classification Search
None
See application file for complete search history.

(56) References Cited

U.S. PATENT DOCUMENTS 7,860,718 B2   12/2010   Lee et al.
8,606,735 B2   12/2013   Cho et al.
(Continued)

FOREIGN PATENT DOCUMENTS

KR   10-0820141 B1      4/2008
KR   10-2010-0119250 A  11/2010

OTHER PUBLICATIONS

Kim et al., Voice Activity Detection Using Motion and Variation of Intensity in the Mouth Region, Journal of Broadcast Engineering, May 2012, vol. 17 No. 3., pp. 522-524.
(Continued)

*Primary Examiner* — Matthew C Bella
*Assistant Examiner* — Brian D Shin
(74) *Attorney, Agent, or Firm* — Jefferson IP Law, LLP (57) ABSTRACT

Provided is a method of detecting a voice section, including detecting from at least one image an area where lips exist, obtaining a feature value of movement of the lips in the detected area based on a difference between pixel values of pixels included in the detected area, and detecting the voice section from the at least one image based on the feature value.

15 Claims, 9 Drawing Sheets

(51) Int. Cl.
*G10L 15/25* (2013.01)
*G06T 7/20* (2017.01)
*G10L 25/78* (2013.01)

(52) U.S. Cl.
CPC ....... *G06K 9/00335* (2013.01); *G06K 9/4642* (2013.01); *G06T 7/20* (2013.01); *G06K 2009/4666* (2013.01); *G10L 25/78* (2013.01)

(56) References Cited

U.S. PATENT DOCUMENTS

| | | | | |
|---|---|---|---|---|
| 8,649,612 | B1* | 2/2014 | Brunner | G06K 9/6292 |
| | | | | 382/118 |
| 2007/0136071 | A1* | 6/2007 | Lee | G10L 15/25 |
| | | | | 704/270 |
| 2008/0309516 | A1* | 12/2008 | Friedrichs | G06K 9/00805 |
| | | | | 340/935 |
| 2009/0220155 | A1* | 9/2009 | Yamamoto | G06K 9/00221 |
| | | | | 382/190 |
| 2010/0097398 | A1* | 4/2010 | Tsurumi | H04N 5/144 |
| | | | | 345/634 |
| 2010/0158373 | A1* | 6/2010 | Li | G06K 9/38 |
| | | | | 382/172 |

OTHER PUBLICATIONS

Lee et al., Visual Voice Activity Detection Using Lip Motion and Direction in Vehicle Environment, The 2013 Fall Conference of Institute of Electronics and Information Engineers, Nov. 2013, pp. 646-647.
Lee et al., A Speech Recognition System based on a New Endpoint Estimation Method Jointly Using Audio/Video Informations, Journal of Broadcast Engineering, Jun. 2003, vol. 8, No. 2, pp. 198-203.
Kim et al., An Efficient Lipreading Method Based on Lip's Symmetry, Journal of the Institute of Electronics Engineers of Korea, Sep. 2000, SP part, vol. 37, No. 5, pp. 105-114.
International Search Report dated Jan. 6, 2016, issued in the International Application No. PCT/KR2015/002654.

* cited by examiner

FIG. 13

METHOD AND DEVICE FOR DETECTING VOICE ACTIVITY BASED ON IMAGE INFORMATION

TECHNICAL FIELD

The inventive concept relates to a method and device for detecting a voice section based on movement information of a lip area.

BACKGROUND ART

Voice section detection refers to distinguishing a voice section from a non-voice section from an input audio signal to perform voice recognition. If a device obtains an audio signal of only a voice section when performing voice recognition, a time taken for the voice recognition may be reduced. However, in a high-noise environment such as a vehicle-driving situation, a variety of noises exist such that there is a limitation in detecting a voice section using only an audio signal.

Conventional methods of detecting a voice section using an image signal mostly include modeling features of an image captured in an indoor environment. However, in a vehicle environment, illumination continuously changes unlike indoors, making it difficult to accurately detect a voice section using conventional methods.

DETAILED DESCRIPTION OF THE INVENTIVE CONCEPT

Technical Solution

The inventive concept provides a method and device for detecting a voice section based on characteristics or features of a lip area.

The inventive concept also provides a method and device for detecting a voice section based on a change of a feature value in a lip area.

Advantageous Effects

According to an embodiment of the inventive concept, based on a feature value of movement of the lips, which is robust against environment changes such as an indoor illumination change and face movement, a voice section may be detected based on an image.

BEST MODE

According to an aspect of the inventive concept, there is provided a method of detecting a voice section, the method including detecting from at least one image an area where lips exist, obtaining a feature value of movement of the lips in the detected area based on a difference between pixel values of pixels included in the detected area, and detecting the voice section from the at least one image based on the feature value.

The obtaining of the feature value may include obtaining an average pixel value of a reference pixel and neighboring pixels of the reference pixel and obtaining the feature value based on a difference between the average value and the reference and neighboring pixels.

The obtaining of the feature value may include obtaining a variance value of each pixel based on a difference between a representative value of the each pixel and the neighboring pixels and a pixel value of the neighboring pixels and obtaining the feature value of the at least one image based on the variance value of each pixel.

The obtaining of the feature value may include obtaining a number of pixels corresponding to the difference being greater than a preset threshold value for the at least one image and obtaining, as a feature value for the image, a difference in the obtained number of pixels between a previous image preceding the image and a next image following the image.

The detecting of the voice section may include determining a point of the feature value as a start point of the voice section if the feature value becomes greater than a first threshold value, setting a count value to 0 if the feature value becomes less than the first threshold value, increasing the count value over time from a point at which the feature value is less than the first threshold value to a point at which the feature value exists between the first threshold value and a second threshold value, and determining as an end point of the voice section, a point at which the count value is greater than a preset gap.

According to another aspect of the inventive concept, there is provided a method of detecting a voice section, the method including detecting from at least one image an area where lips exist, obtaining movement information of each pixel included in the detected area, dividing the detected area in such a way that divided regions are symmetric to each other, obtaining for the at least one image, a feature value of movement of the lips in the detected area based on a difference between movement information of the divided regions, and detecting the voice section based on the feature value for the at least one image.

The obtaining of the movement information may include obtaining the movement information of each pixel by using an optical flow method.

According to another aspect of the inventive concept, there is provided a device for detecting a voice section, the device including a receiving unit configured to receive at least one image comprising a user's face and a control unit configured to detect from at least one image an area where lips exist, to obtain a feature value of movement of the lips in the detected area based on a difference between pixel values of pixels included in the detected area, to detect the voice section from the at least one image based on the feature value, and to perform voice recognition based on an audio signal corresponding to the detected voice section.

According to another aspect of the inventive concept, there is provided a device for detecting a voice section, the device including a receiver configured to receive at least one image comprising a user's face and a controller configured to detect from at least one image an area where lips exist, to obtain movement information of each pixel included in the detected area, to divide the detected area in such a way that divided regions are symmetric to each other, to obtain for the at least one image, a feature value of movement of the lips in the detected area based on a difference between movement information of the divided regions, to detect the voice section based on the feature value for the at least one image, and to perform voice recognition based on an audio signal corresponding to the detected voice section.

MODE OF THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the inventive concept and do not represent all of the technical spirit of the inventive concept, and thus it is to be understood that various equivalents and modified examples, which may replace the configurations, are possible when filing the present application.

Some elements are exaggerated, omitted, or schematically illustrated in the drawings. As such, actual sizes of respective elements are not necessarily represented in the drawings. Therefore, the present invention is not limited by relative sizes and/or distances in the accompanying drawings.

When a part "includes" a component, if there is no specific opposite statement, it means that the part may further include other components without excluding another component. The term 'unit' used herein refers to software, or a hardware element, such as a Field-Programmable Gate Array (FPGA) or an Application Specific Integrated Circuit (ASIC), in which a 'unit' performs a certain function. However, the 'unit' is not limited to software or hardware. The term 'unit' may be configured to be in an addressable storage medium or to reproduce one or more processors. Thus, for example, the 'unit' includes elements, such as software elements, object-oriented software elements, class elements, and task elements, processes, functions, properties, procedures, sub-routines, segments of a program code, drivers, firmware, a micro-code, tables, arrays, and variables. Functions provided in elements and the 'unit's may be combined with a smaller number of elements and 'unit's or may be subdivided into additional elements and 'unit's.

In the following description, with reference to the accompanying drawings, embodiments of the inventive concept will be described in detail to allow those of ordinary skill in the art to easily carry out the inventive concept. However, the inventive concept may be implemented in various different forms and is not limited to the above-described embodiment. A part irrelevant to the description is omitted to clearly describe the inventive concept, and similar parts are referred to as similar reference numerals throughout the specification.

Hereinafter, embodiments of the inventive concept will be described with reference to the accompanying drawings.

Figure 1:
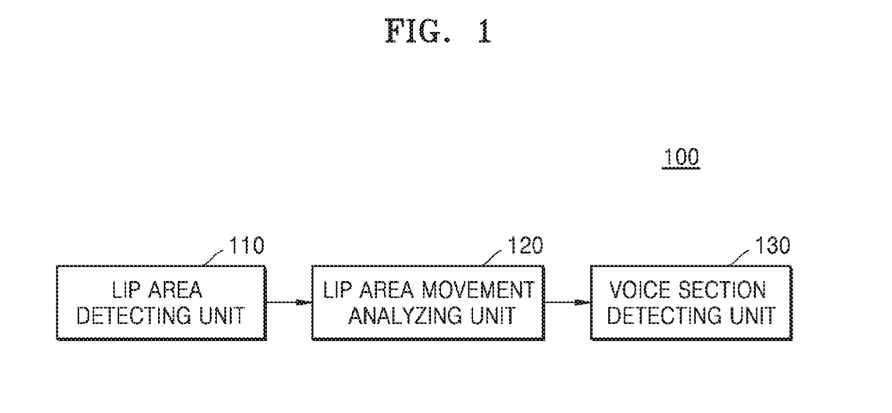
FIG. 1 is a block diagram of a device which detects a voice section based on characteristics of a lip area, according to an embodiment of the inventive concept.

FIG. 1 is a block diagram of a device for detecting a voice section based on characteristics or features of a lip area, according to an embodiment of the inventive concept.

A device 100 according to an embodiment of the inventive concept analyzes characteristics of a lip area of a user that are included in an image signal corresponding to an audio signal to detect a voice section of the audio signal. When the device 100 performs voice recognition, the device 100 detects a voice section in which the user is speaking by analyzing an image. The device 100 may detect a voice section by taking into account an audio signal corresponding to the voice section as well as the image. The device 100 may perform voice recognition with high accuracy by performing voice recognition on the audio signal corresponding to the detected voice section.

The device 100 detects a voice section by analyzing characteristics of a lip area in a captured image of a face of the user in real time. Movement and shape of the lips in a speaking situation where someone speaks are different from those of the lips in a before-speaking situation before someone speaks. For example, if the lips move, this situation may be determined as a speaking situation. Thus, the device 100 may detect a voice section determined as a section in which the user is speaking by analyzing characteristics of the movement and shape of the lips in an image.

Referring to FIG. 1, the device 100 may include a lip area detecting unit 110, a lip area movement analyzing unit 120, and a voice section detecting unit 130.

The lip area detecting unit 110 detects an area in which the user's lips are situated from an image signal. A method of detecting a lip area will be described in more detail with reference to FIG. 2.

Figure 2:
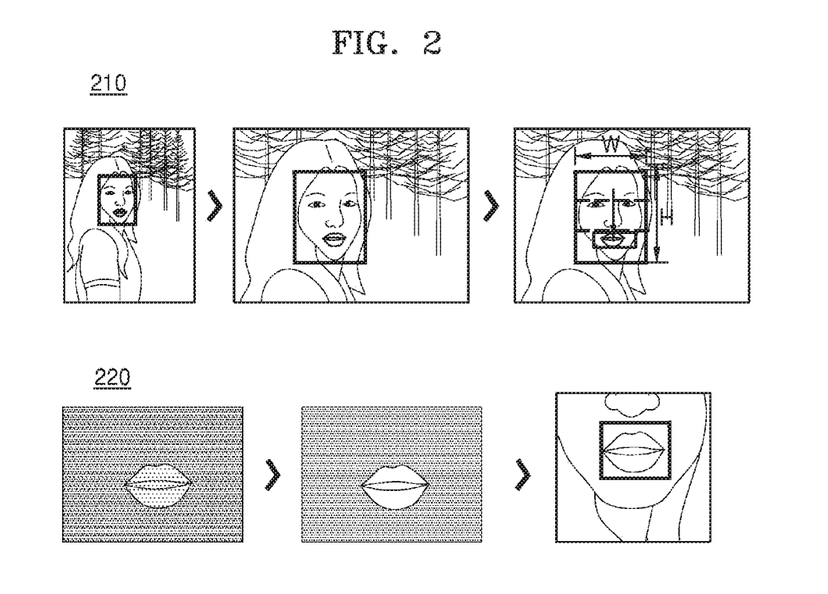
FIG. 2 illustrates an example of detecting a lip area according to an embodiment of the inventive concept.

FIG. 2 illustrates an example of detection of a lip area according to an embodiment of the inventive concept.

As indicated by 210 of FIG. 2, the lip area detecting unit 110 detects a facial area from an image and detects the eyes from the detected facial area to detect a lip area based on geometric location information regarding the lips and the eyes. Detection of the facial area may use various face detection methods including a face detection method proposed by Viola and Jones.

In another way, the lip area detecting unit 110 may detect a facial area and detect a lip area by using an YCbCr color space in the detected facial area, as indicated by 220 of FIG. 2. Referring to 220 of FIG. 2, the lip area detecting unit 110 detects from the YCbCr color space, an area where Cb and Cr values clearly contrast, and binarizes pixel values of the detected area. The lip area detecting unit 110 detects, as a lip area, an area including the shape of the lips in the binarized image area. The Cr and Cb values of the lips in the YCbCr color space may clearly contrast with Cr and Cb values of the face. Thus, the lip area detecting unit 110 may detect the lips by using the Cr and Cb values in the facial area.

Without being limited to the above-described example, the lip area detecting unit 110 may detect a lip area from an image by using various methods.

The lip area movement analyzing unit 120 of FIG. 1 analyzes characteristics of the lip area to determine a voice section based on an image determined as an image in which the user is speaking. Due to characteristics of the shapes of the lips and teeth, a difference between pixel values of neighboring pixels may be larger in an image including open lips than in an image including closed lips. Thus, the lip area movement analyzing unit 120 may detect movement of the lips by calculating a difference between pixel values of neighboring pixels.

The lip area movement analyzing unit 120 converts an image of the lip area into a gray-scale image for image analysis using pixel values, thus analyzing characteristics of the lip area.

The lip area movement analyzing unit 120 calculates a variance value of a reference pixel and neighboring pixels located near the reference pixel in the lip area of the image by using Equation (1). The reference pixel may include at least one of the pixels included in the image of the lip area.

$$VAR_{P,R} = \frac{1}{P}\sum_{p=0}^{P}(g_p - \mu)^2, \text{ where } \mu = \frac{1}{P}\sum_{p=0}^{P}g_p, \quad (1)$$

where $g_p$ represents pixel values of P pixels that are equi-distant by R from the reference pixel and a pixel value of the reference pixel. For example, if R is set to 1 and P is set to 8, $g_p$ may represent pixel values of 8 pixels distant by 1 from the reference pixel and a pixel value of the reference pixel.

$VAR_{P,R}$ uses a difference between an average $\mu$ and the pixel values of the neighboring pixels, $g_p$, and thus does not change with illumination in an image. As a result, in an outdoor environment where illumination changes, the value $VAR_{P,R}$ may be robust. Also, when a face moves to the left and to the right, the value $VAR_{P,R}$ based on a pixel value difference does not change, minimizing erroneous detection of a feature value of the lip area according to movement in the face.

Hereinafter, a method of obtaining the value $VAR_{P,R}$ will be described in more detail with reference to FIG. 3.

Figure 3:
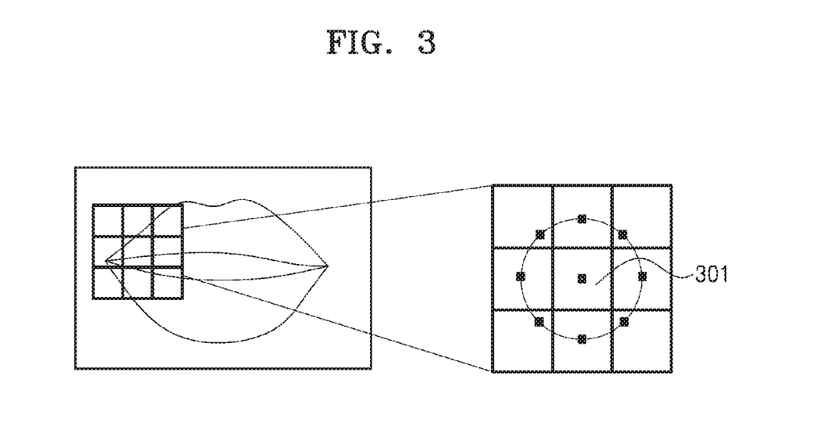
FIG. 3 illustrates an example of a method of calculating a value $VAR_{P,R}$ according to an embodiment of the inventive concept.

FIG. 3 illustrates an example of a method of obtaining the value $VAR_{P,R}$, according to an embodiment of the inventive concept.

Referring to FIG. 3, the lip area movement analyzing unit 120 obtains the value $VAR_{P,R}$ in a 3×3 block around each pixel included in the lip area. A reference pixel 301 may be located in the center of the block. The lip area movement analyzing unit 120 obtains a histogram for the value $VAR_{P,R}$ obtained with respect to each pixel of the lip area. After the image of the lip area is re-sized into 60 pixels-by-40 pixels for histogram normalization, the histogram for the value $VAR_{P,R}$ may be obtained. The histogram for the value $VAR_{P,R}$ will be indicated by a local variance histogram (LVH).

The LVH will be described in more detail with reference to FIG. 4.

Figure 4:
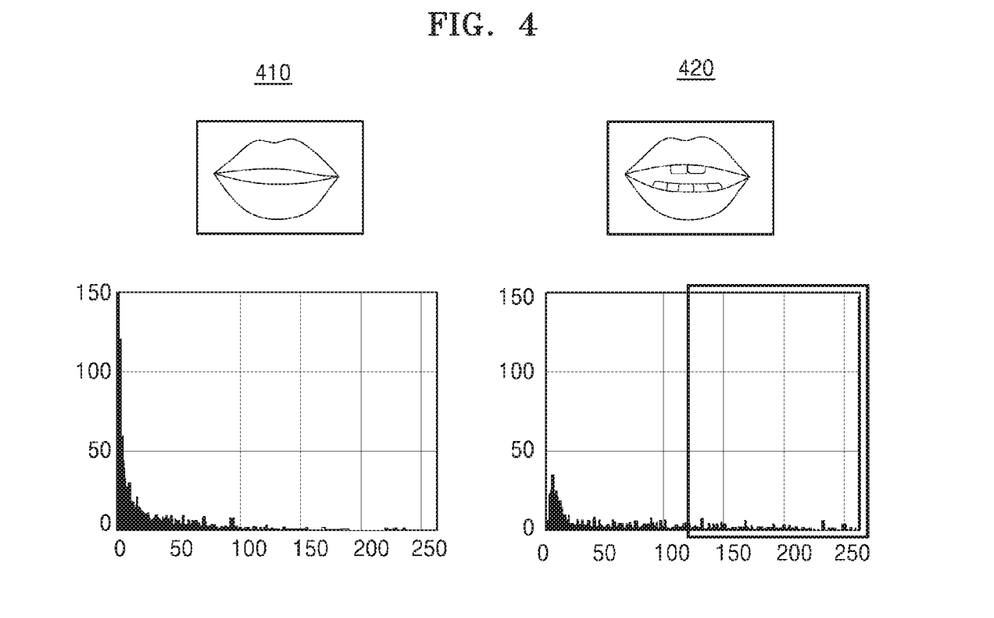
FIG. 4 illustrates an example of a local variance histogram (LVH) according to an embodiment of the inventive concept.

FIG. 4 illustrates an example of the LVH according to an embodiment of the inventive concept.

Referring to 410 and 420 of FIG. 4, an image including closed lips has a smaller pixel value difference between neighboring pixels than an image including open lips. Thus, an LVH 420 of an image including open lips may include more pixels having larger values $VAR_{P,R}$ than an LVH 410 of an image including closed lips. Thus, the lip area movement analyzing unit 120 may obtain a feature value of a lip area in each image based on the number of pixels having large values $VAR_{P,R}$ in an LVH.

The lip area movement analyzing unit 120 may obtain the number of pixels having larger values $VAR_{P,R}$ than a threshold value T in an LVH for a lip area of each image, as expressed in Equation (2).

In addition, by taking into account that the shapes of the lips may largely change between adjacent images because the lips continuously move during when a user is speaking, the lip area movement analyzing unit 120 obtains a pixel-number difference between the adjacent images as a feature value of the lip area.

$$g[n] = \sum_{i=T}^{M} H_n(i), \quad (2)$$
$$x[n] = |g[n] - g[n-1]|,$$

where $H_n(i)$ represents the number of pixels having a value $VAR_{P,R}$ of i in a lip area of an $n^{th}$ image, and i may have a value from 0 to M. g(n) represents a sum of the numbers of pixels having values $VAR_{P,R}$ that are greater than the threshold value T. x(n) represents a difference between a g-value difference between the $n^{th}$ image and an adjacent image.

Figure 5:
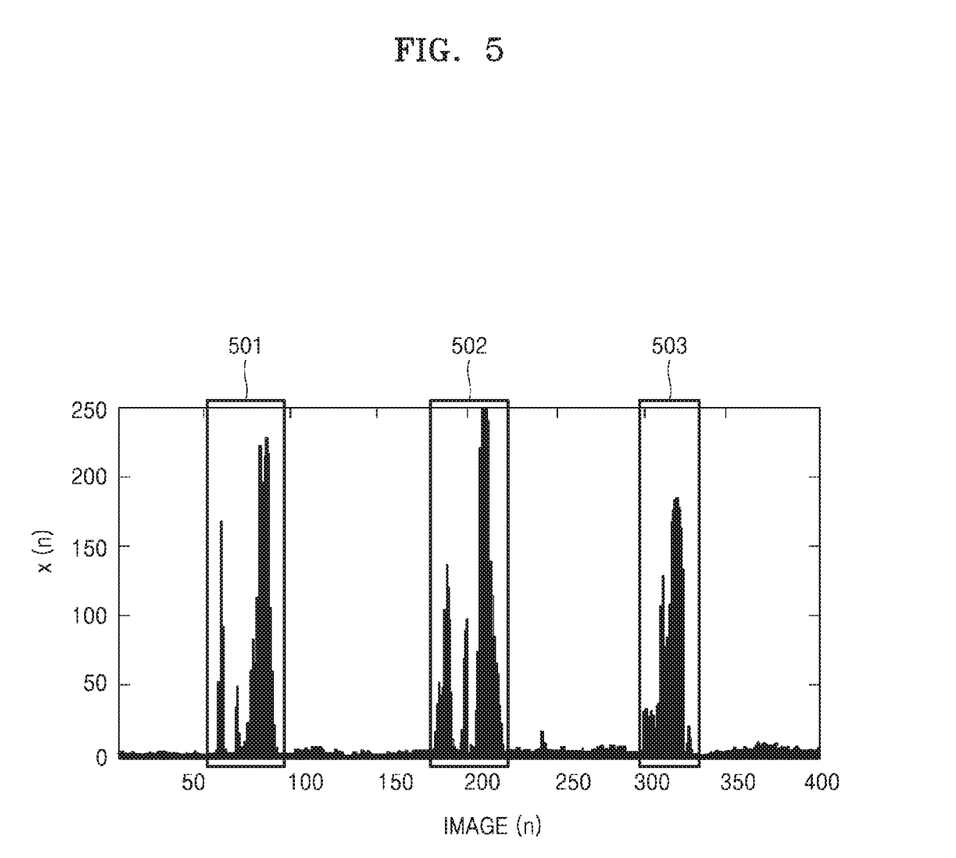
FIG. 5 is a graph showing a value x(n) according to an embodiment of the inventive concept.

With reference to FIG. 5, x(n) will be described in more detail.

FIG. 5 is a graph showing x(n) according to an embodiment of the inventive concept.

When the user is speaking, the lips of the user continuously move, such that the shapes of the lips may change largely between adjacent images. Thus, during when a user is speaking, a difference in the number of pixels having values $VAR_{P,R}$ that are greater than the threshold value T may increase between the adjacent images, such that x(n) may have a larger value in a voice section than in a non-voice section.

Referring to FIG. 5, x(n) in voice sections 501, 502, and 503 has a larger value than x(n) in a non-voice section. Thus, the device 100 may distinguish a voice section from a non-voice section based on x(n).

The threshold value T may be determined based on a statistical model of a voice signal and a noise signal. By letting $H_1$ be a hypothesis in which a current input image is a voice section and $H_0$ be a hypothesis in which the current input image is a non-voice section, these two hypotheses may be expressed as Equation (3):

$$H_0(\text{no lip activity}):x[n]=\omega[n]$$

$$H_1(\text{lip activity}):x[n]=s[n]+\omega[n] \qquad (3)$$

where s(n) and ω(n) represent a signal for energy and a noise signal in the n$^{th}$ image, respectively. To model the noise signal ω(n), the lip area movement analyzing unit 120 may assume an image section of an initial section to be a non-voice section at all times.

The lip area movement analyzing unit 120 according to an embodiment of the inventive concept may obtain the threshold value T by using $P_{FA}=\alpha$ and $\alpha=0.1$ based on the Neyman-Pearson theory. The value α represents an allowable error limit and may have a value other than 0.1.

$$\Lambda(X) = \frac{p(X \mid H_1)}{p(X \mid H_0)} > T, \qquad (4)$$

where X represents a vector of X=[x(1), x(2), . . . , x(N)], and Λ(X) represents a likelihood ratio for a voice section and a non-voice section. p(X|H1) represents a likelihood based on the hypothesis in which the input image is the voice section, and p(X|H0) represents a likelihood based on the hypothesis in which the input image is the non-voice section. If the likelihood is greater than the threshold value T, the hypothesis in which the input image is the voice section may be adopted. Using Equation (5), the threshold value T based on the user-designated allowable error limit may be determined:

$$P_{FA}=\int_T^\infty p(X|H_0)dX=\alpha \qquad (5)$$

The lip area movement analyzing unit 120 may determine the threshold value T for obtaining x(n) by using Equation (5). By estimating T that makes $P_{FA}$, which is a probability of erroneously determining that the input image of the non-voice section is the voice section, be the allowable error limit α, the threshold value T may be determined. The lip area movement analyzing unit 120 may use an edge detection filter to obtain x(n) for each image and to finally detect a voice section. The lip area movement analyzing unit 120 may apply to a feature value, x(n), an edge detection filter for using characteristics in which the feature value x(n) increases in a voice start section and decreases in a voice end section. The voice section detecting unit 130 may finally detect a voice section by using the feature value to which the edge detection filter is applied and a state transition model.

The edge detection filter will be described in more detail with reference to FIG. 6.

Figure 6:
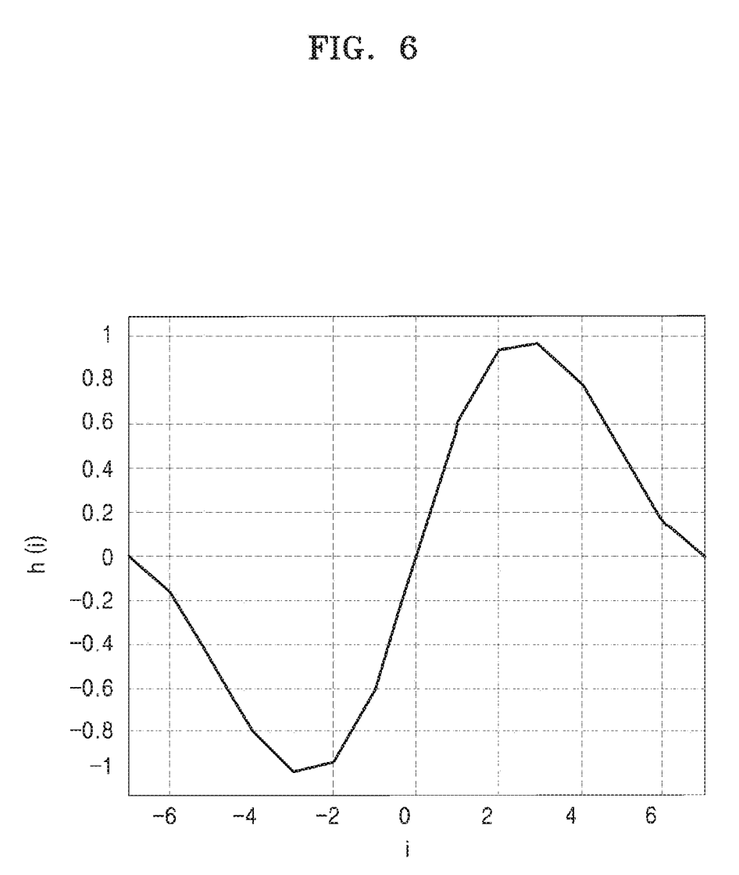
FIG. 6 is a graph showing an example of an edge detection filter according to an embodiment of the inventive concept.

FIG. 6 is a graph illustrating an example of the edge detection filter according to an embodiment of the inventive concept.

An edge detection filter h(i) may be expressed as follows:

$$f(x) = e^{Ax}[K_1\sin(Ax) + K_2\cos(Ax)] + \qquad (6)$$
$$e^{-Ax}[K_3\sin(Ax) + K_4\cos(Ax)] + K_5 + K_6 e^{xx}$$

$$h(i) = \begin{cases} -f(i), & -W \le i \le 0 \\ f(i), & 1 \le i \le W \end{cases}, \qquad (6)$$

where W represents a variable related to a filter length and i may be an integer value from—W to W. A (A=0.41) and K ($K_1$=1.538, $K_2$=1.468, $K_3$=−0.078, $K_4$=−0.036, $K_5$=−0.872, $K_6$=−0.56) represents a filter parameter. The lip area movement analyzing unit 120 applies the edge detection filter h(i) to the feature value x(n) to obtain an output F(n) as given by Equation (7). F(n) represents a result of applying the edge detection filter to the feature value x(n) for movement of the lips in the image.

$$F(n) = \sum_{i=-W}^{W} h(i)\chi(n+i) \qquad (8)$$

The edge detection filter h(i) (W=7) is symmetric about the origin, as shown in the graph of FIG. 6. In the non-voice section, the value x(n) is constant, such that h(i)×(n+i) has the same positive and negative values from—W to W and the feature value to which the edge detection filter is applied may be close to 0. On the other hand, if the feature value decreases, a component having a negative integer value increases, such that the feature value to which the edge detection filter is applied decreases. Therefore, the lip area movement analyzing unit 120 may detect a voice section with robustness even for a gradually changing feature value by using the edge detection filter, without a need to adjust a threshold value according to the strength of noise.

The voice section detecting unit 130 may finally detect a voice section by using F(n) and a state transition model.

A detailed description will now be made of a method of detecting a voice section by using the state transition model with reference to FIGS. 7 through 9.

Figure 7:
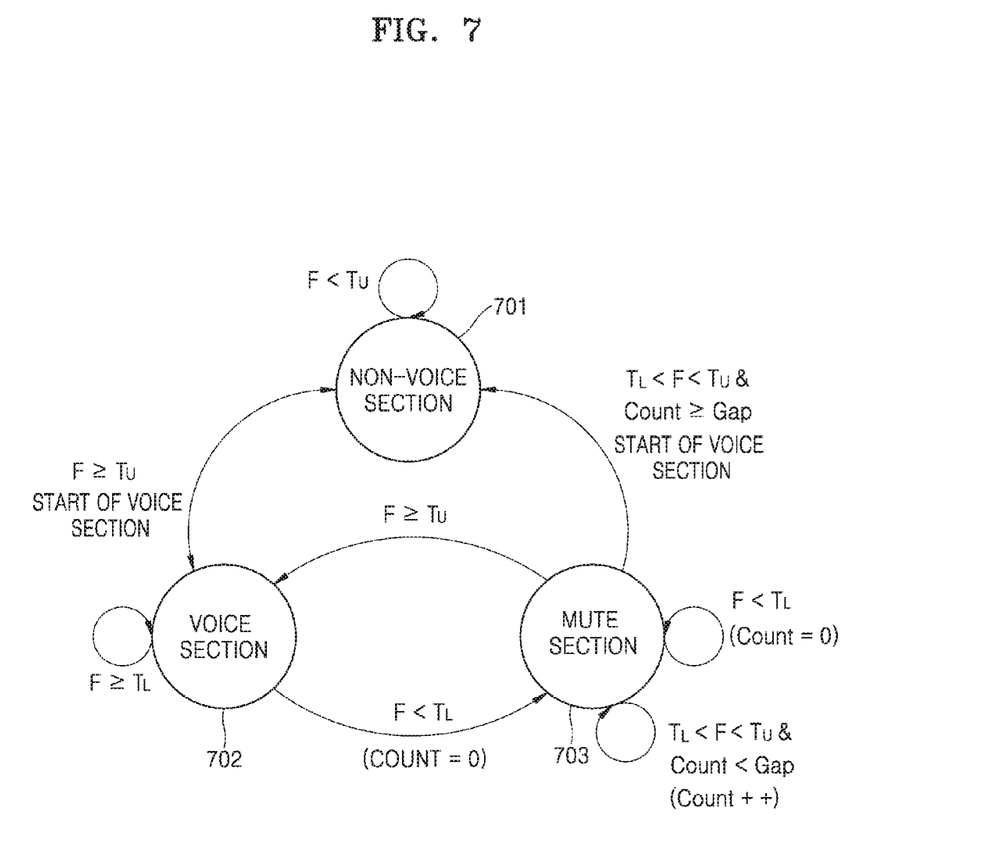
FIG. 7 illustrates an example of a state transition model according to an embodiment of the inventive concept.

FIG. 7 illustrates an example of the state transition model according to an embodiment of the inventive concept.

Referring to FIG. 7, the voice section detecting unit 130 detects a voice section by using the state transition model illustrated in FIG. 7.

A non-voice section 701 means a section in which it is determined that voice does not exist in an audio signal corresponding to an image. A voice section 702 means a section in which it is determined that voice desired to be detected by the voice section detecting unit 130 exists in the audio signal corresponding to the image. A mute section 703 means a section that may state-transit to the voice section 702 or the non-voice section 701 according to the following count value. A lower threshold $T_L$, an upper threshold $T_U$, and a gap are reference values for determining whether the voice section 702 ends, and are constants that may be experimentally determined. $T_U$ may be greater than $T_L$ at all times.

The voice section detecting unit 130 may determine the non-voice section 701 having no voice, if F(n) is less than $T_U$, by using the state transition model. If F(n) is greater than $T_U$, the voice section detecting unit 130 determines that the voice section 702 starts, and the voice section detecting unit 130 determines a point at which F(n) is greater than $T_U$ as a point at which the voice section 702 starts. If F(n) is less than $T_L$ after the voice section 702 starts, the voice section detecting unit 130 determines that the image state-transits to the mute section 703 and sets a count value to 0.

The voice section detecting unit 130 determines that the image is in the mute section 703 when F(n) is less than $T_U$, but is greater than $T_L$, and increases the count value over time. The voice section detecting unit 130 determines that the voice section 702 ends, if the count value is greater than a preset gap value, and determines that the current image is in the non-voice section 701. The voice section detecting unit 130 state-transits to the voice section 702 as F(n) is greater than $T_U$.

Figure 8:
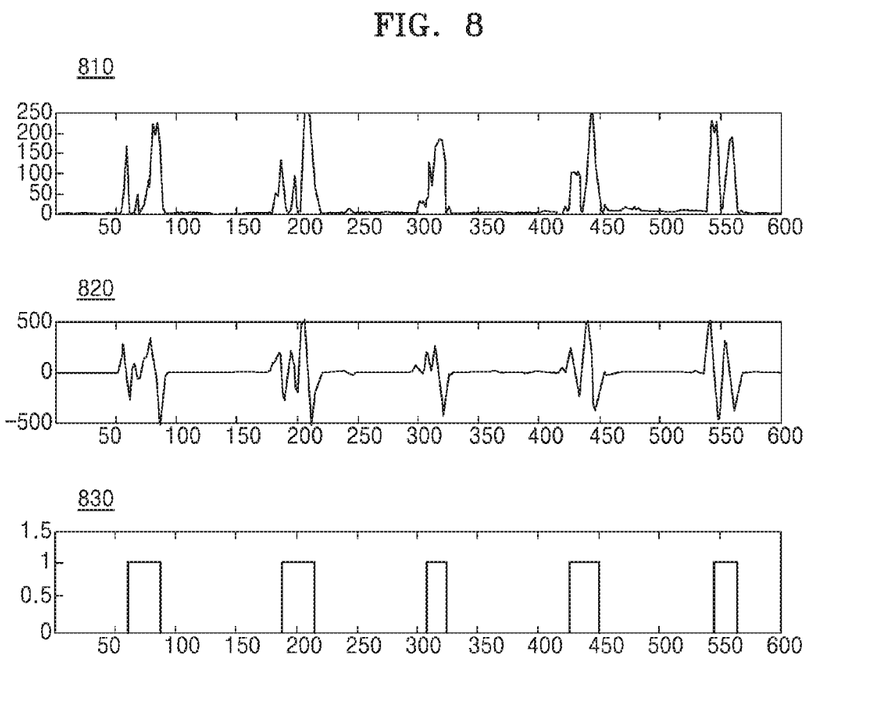
FIG. 8 is a graph showing an example of x(n), F(n), and a section detected as a voice section according to an embodiment of the inventive concept.

FIG. 8 is a graph illustrating an example of x(n), F(n), and a section detected as a voice section according to an embodiment of the inventive concept.

Referring to FIG. 8, in 810, x(n) that may be extracted as a feature value of an LVH is shown. 830 indicates a graph showing a section detected as a voice section. When the graph 830 for the section detected as the voice section is compared with the graph 810, x(n) may change largely in a section corresponding to the voice section.

820 indicates a graph showing F(n) that is a result of applying the edge detection filter to x(n). A section where F(n) is greater than $T_L$ or F(n) is less than $T_U$ corresponds to the voice section shown in 830. In a section corresponding to the voice section in 830, a mute section exists in which F(n) is between $T_L$ and $T_U$. The mute section exists for a smaller time than a non-voice section, such that the voice section detecting unit 130 may determine a section where the count value is less than the gap value as a voice section.

Figure 9:
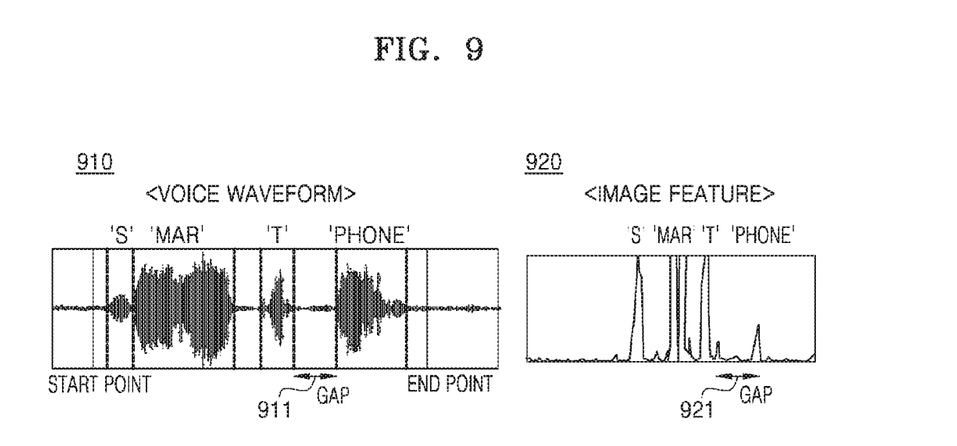
FIG. 9 illustrates an example of a mute section according to an embodiment of the inventive concept.

FIG. 9 illustrates an example of a mute section according to an embodiment of the inventive concept.

Referring to 910 of FIG. 9, when the user says "smartphone", a gap section 911 may exist in which there is no voice for a predetermined time between 't' and 'phone'. In the gap section 911, movement of the lips may slow down as there is no voice. Thus, x(n) detected as a feature value of movement of the lips in the image may also have a value close to 0 in the gap section 921.

The voice section detecting unit 130 experimentally determines the length of a gap section that may be used in determining a voice section, by using the above-described state transition model. For example, the voice section detecting unit 130 may determine the length of a gap section based on a user-specific speaking habit and user's feature information that may affect the speaking habit.

Hereinafter, a method of detecting a voice section by using the device 100 will be described in detail with reference to FIG. 10.

Figure 10:
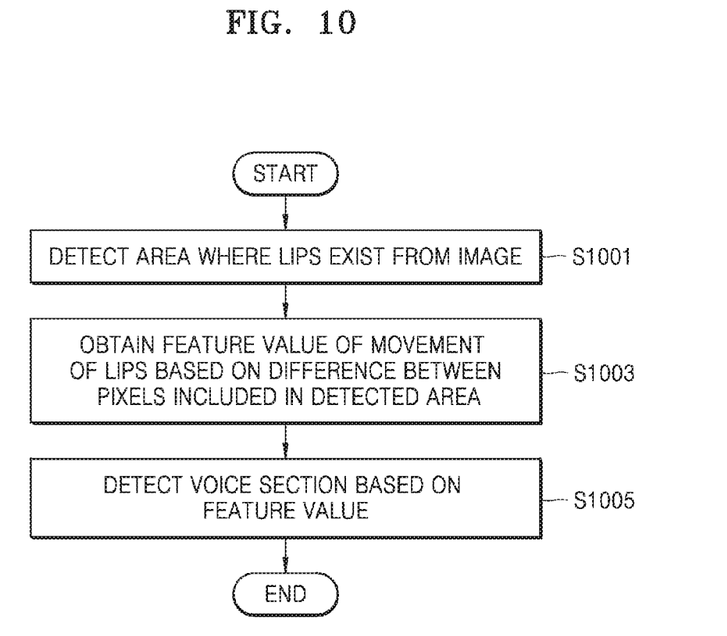
FIG. 10 is a flowchart illustrating a method of detecting a voice section, according to an embodiment of the inventive concept.

FIG. 10 is a flowchart illustrating a method of detecting a voice section, according to an embodiment of the inventive concept.

Referring to FIG. 10, in operation S1001, the device 100 detects an area where the lips exist from an image. For example, the device 100 detects a facial area and detects the eyes from the facial area to detect a lip area based on geometric location information regarding the lips and the eyes. In another way, the device 100 may detect the facial area and detect the lip area from the detected facial area based on a pixel value difference in a YCbCr color space.

In operation S1003, the device 100 obtains a feature value corresponding to movement of the lips based on a pixel-value difference between neighboring pixels of each pixel included in the detected area.

For example, the device 100 may obtain a difference between pixel values of neighboring pixels around each pixel included in the detected lip area and obtain a feature value of the lips area based on the difference. The feature value of the lip area may be obtained based on a variance value $VAR_{P,R}$ of a reference pixel and neighboring pixels. The feature value of movement of the lips may be determined based on an LVH indicating the number of pixels having larger variance values than a threshold value T. The number of pixels determined based on the LVH will be expressed using an LVH value.

The device 100 may also determine a difference between LVH values of adjacent images as a feature value of movement of the lips, considering that the lips are continuously open and closed for a short time when the user speaks.

The device 100 applies an edge detection filter to the feature value of movement of the lips to minimize the occurrence of an error caused by noise.

In operation S1005, the device 100 detects a voice section based on the feature value obtained in operation S1003. For example, the device 100 may detect the voice section by using the above-described state transition model.

The device 100 may detect, as the voice section, a point in time where the feature value is greater than $T_U$, and increases a count value while the feature value is between $T_U$ and $T_L$. The device 100 may determine a corresponding image section as a non-voice section if the count value is greater than a preset gap value.

In an embodiment of the inventive concept, the image section that may be detected as a voice section is detected based on a feature value for a lip area of the image, and strictly speaking, is a section estimated based on characteristics of the lip area as a section having a high probability that the user is speaking. The device 100 may modify the detected voice section based on the feature value of the lip area of the image by referring to an actual audio signal.

Another method of detecting a voice section based on movement of the lips will be described in more detail with reference to FIGS. 11 and 12.

Figure 11:
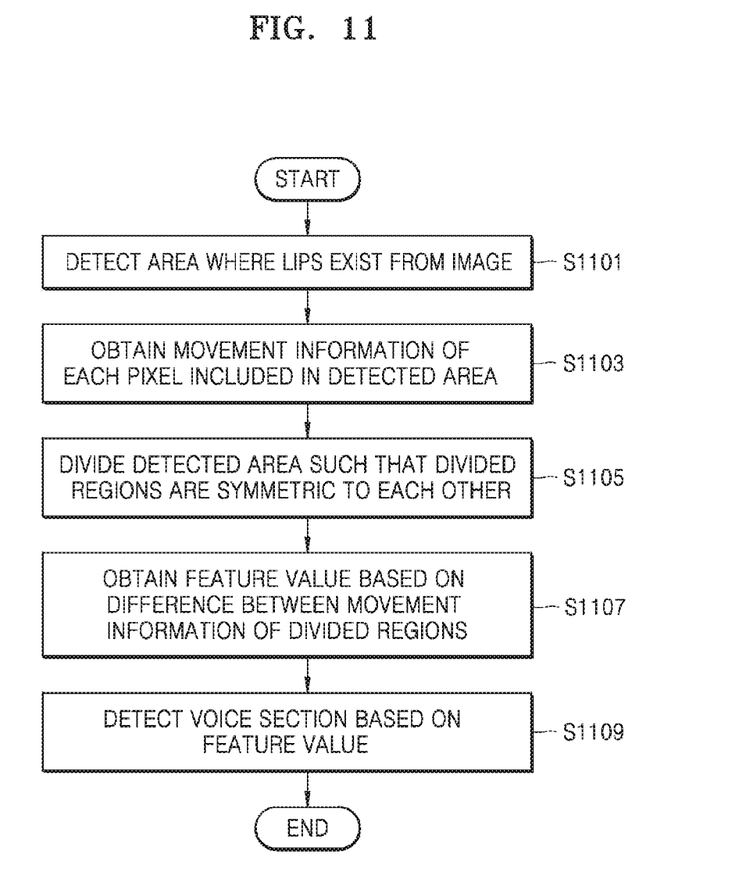
FIG. 11 is a flowchart illustrating a method of detecting a voice section based on movement of the lips, according to an embodiment of the inventive concept.

FIG. 11 is a flowchart illustrating a method of detecting a voice section based on movement of the lips, according to an embodiment of the inventive concept.

Referring to FIG. 11, in operation S1101, the device 100 detects an area where the lips exist from an image. For example, the device 100 may detect a facial area and detect eyes from the facial area to detect a lip area based on geometric location information of the eyes and the lips. In another way, the device 100 may detect a facial area and detect a lip area from the detected facial area based on pixel values in a YCbCr color space.

In operation S1103, the device 100 obtains movement information regarding each pixel included in the lip area detected in operation S1101. The movement information of each pixel may include a movement vector value for each pixel as given by Equation (8). $v_x(i, j)$ and $v_y(i, j)$ represent velocity values for x and y directions at a pixel (i, j) of an image of a lip area having a size of m×n.

$$V=[v_x(1,1), \ldots, v_x(m,n), v_y(1,1), \ldots, v_y(m,n)] \quad (8)$$

For example, the device 100 may obtain the movement information of each pixel included in the current image by using pixel values of an adjacent image. To indicate movement of each pixel in the form of a velocity vector in continuous images, an optical flow method may be used. By using the optical flow method, the device 100 searches for the most similar blocks in two consecutive images, thus obtaining movement of each pixel in the form of a velocity vector.

When the device 100 obtains the movement information of each pixel by using the optical flow method, the device 100 may obtain the movement information based on pixel values in two temporally adjacent images. Thus, the device 100 may obtain the movement information with robustness even in an illumination-varying environment.

In operation S1105, the device 100 divides the lip area detected in operation S1101 such that the divided regions are symmetric to each other.

The lips are symmetric horizontally or vertically, and movement of the lips is also symmetric horizontally or vertically. When the lips are stationary and the face moves, movement information exists for a lip area even if the lips do not move, resulting in an error during extraction of a feature value of movement of the lips. Thus, the device 100 may obtain the feature value of movement of the lips by using symmetry of the lip movement information.

In operation S1107, the device 100 obtains a feature value of movement of the lips by using a difference between movement information of the regions divided in operation S1105. For example, the device 100 may obtain a feature value E of movement of the lips as given by:

$$E = \left| \sum_{i,j \in A} v_x(i,j) - \sum_{i,j \in B} v_x(i,j) \right|^2 + \left| \sum_{i,j \in A} v_y(i,j) - \sum_{i,j \in B} v_y(i,j) \right|^2 \quad (9)$$

The feature value E of movement of the lips may be obtained based on a difference between movement vector values respectively included in the divided region. Thus, in the feature value E, a movement vector value in the same direction included in each region like facial movement is offset and only a movement vector value in the opposite direction like movement of the lips may exist.

In operation S1109, the device 100 obtains a voice section based on the feature value obtained in operation S1107.

For example, the device 100 may determine again a feature value difference with an adjacent image, such as the above-described x(n), as a feature value of movement of the lips. The device 100 applies an edge detection filter to the feature value of movement of the lips, thus minimizing an error caused by noise. The device 100 detects a voice section by using the above-described state transition model.

Figure 12:
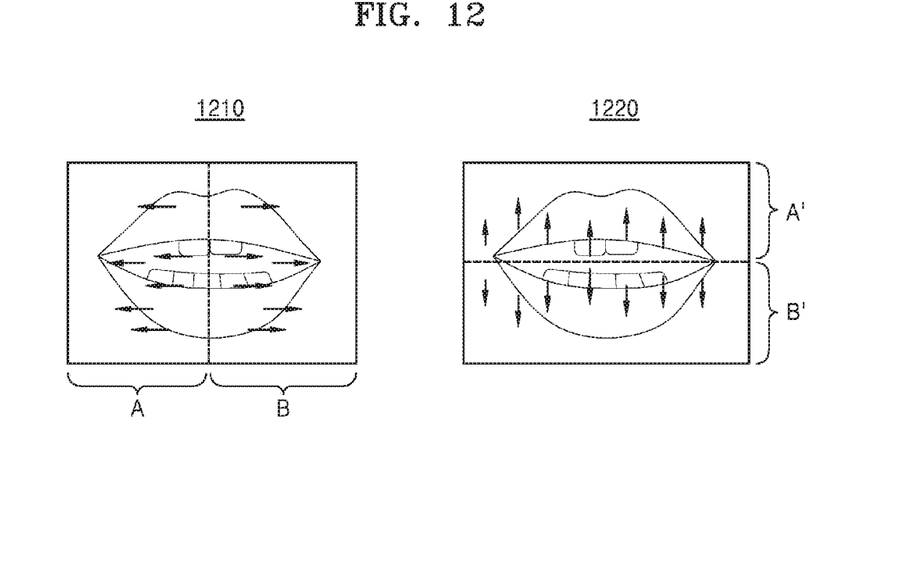
FIG. 12 illustrates an example in which a lip area is divided according to an embodiment of the inventive concept.

FIG. 12 illustrates an example in which a lip area is divided according to an embodiment of the inventive concept.

Referring to 1210 of FIG. 12, the device 100 horizontally divides the lip area and obtains the feature value E based on a difference between x-direction vector values of respective pixels. Referring to 1220, the device 100 vertically divides the lip area and obtains the feature value E based on a difference between y-direction vector values of respective pixels.

Figure 13:
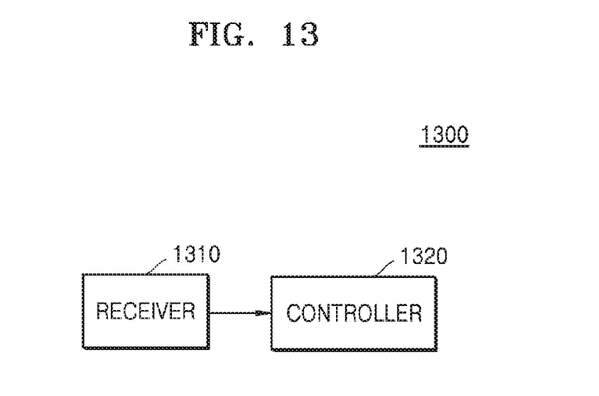
FIG. 13 is a block diagram of an internal structure of a device for detecting a voice section based on movement of the lips, according to an embodiment of the inventive concept.

FIG. 13 is a block diagram of an internal structure of a device for detecting a voice section based on movement of the lips, according to an embodiment of the inventive concept.

A device 1300 according to an embodiment of the inventive concept may be a terminal device capable of performing voice recognition, and may include, for example, a smart TV, an Ultra High Definition (UHD) TV, a monitor, a Personal Computer (PC), a laptop computer, a mobile phone, a tablet PC, a navigation terminal, a smartphone, a Personal Digital Assistant (PDA), a Portable Multimedia Player (PMP), a digital broadcasting receiver, and so forth.

Referring to FIG. 13, the device 1300 may include a receiver 1310 and a controller 1320.

The receiver 1310 obtains an image including a user's lip area for detecting a voice section. The receiver 110 may obtain the image including the lip area from a photographing device or an external device. The receiver 1310 may further obtain an audio signal including a user's voice to perform voice recognition based on the voice section detected by the device 1300. The device 1300 estimates a section determined as a section where a voice section exists based on the image including the lip area, and performs voice recognition on the user's voice included in the audio signal.

The controller 1320 detects the voice section based on a plurality of images including the lip area received by the receiver 1310. For example, the controller 1320 detects the lip area from the image and obtains a feature value of movement of the lips in each image based on a pixel-value difference between pixels included in the lip area. The controller 1320 obtains a variance value with respect to each pixel obtained based on a pixel-value difference between neighboring pixels, and obtains an LVH value indicating the number of pixels having larger variance values than a threshold value T.

The controller 1320 determines a difference between LVH values of adjacent images as a feature value of movement of the lips, considering that the lips are continuously open and closed for a short time when the user speaks.

The controller 1320 obtains a feature value of movement of the lips based on movement information for each pixel included in the lip area. The control unit 1320 detects a voice section from the image by using a state transition model based on the feature value of movement of the lips. The movement information for each pixel may be obtained using an optical flow method. The controller 1320 obtains the feature value of movement of the lips based on a difference between movement information of respective regions divided from the lip area in such a way that the regions are symmetric to each other.

In addition, the controller 1320 may perform voice recognition on an audio signal corresponding to the detected voice section. The controller 1320 performs voice recognition on an audio signal determined to include the user's voice, thereby minimizing erroneous recognition caused by noise.

According to an embodiment of the inventive concept, based on a feature value of movement of the lips, which is robust against environment changes such as an indoor illumination change and face movement, a voice section may be detected based on an image.

A method according to some embodiments of the inventive concept may be implemented in the form of a program command executable through various computer means and may be recorded on a computer-readable recording medium. The computer-readable recording medium may include a program command, a data file, and a data structure alone or in combination. The program command recorded on the medium may be specially designed and constructed for the inventive concept or may be known to and used by those skilled in computer software. Examples of the computer-readable recording medium include magnetic media such as a hard disk, a floppy disk or a magnetic tape, optical media such as a Compact Disc (CD)-Read Only Memory (ROM) or a Digital Versatile Disc (DVD), magneto-optical media such as a floptical disk, and a hardware device specially constructed to store and perform a program command, such as ROM, Random Access Memory (RAM), or a flash memory. Examples of the program command include machine code generated by a compiler and high-level language code executed by a computer using an interpreter.

While the foregoing description has been made, focused on novel features of the inventive concept applied to various embodiments, it should be understood that various deletions, substitutions and modifications in the form and details of the above-described apparatus and method can be made by a person skilled in the art without departing from the spirit and scope of the inventive concept. Therefore, the scope of the inventive concept may be defined by the appended claims rather than the above description. Any change in the equivalent range to the claims is included in the scope of the inventive concept.

The invention claimed is:

1. A method of detecting a voice section, the method comprising:
   detecting, from a first image of a plurality of images, pixels in an area where lips exist;
   obtaining a feature value of movement of the lips in the area for the first image based on a reference pixel value of a reference pixel, which is located in the area where the lips exist, in the first image and pixel values of neighboring pixels located around the reference pixel in the first image; and
   determining the voice section from the first image based on the feature value,
   wherein the obtaining of the feature value comprises:
      obtaining an average pixel value of the reference pixel value and the pixel values of the neighboring pixels located around the reference pixel; and
      obtaining the feature value based on differences between the average pixel value and the pixel values for at least one of the reference pixel or the neighboring pixels.

2. The method of claim 1, further comprising:
   obtaining a variance value of each of the pixels included in the area based on a difference between a representative value of each of the pixels in the area and the pixel values of the neighboring pixels located around each of the pixels; and
   obtaining the feature value of the plurality of images based on the variance value of each of the pixels.

3. The method of claim 1, further comprising:
   obtaining a number of pixels corresponding to a difference being greater than a preset threshold value for the plurality of images; and
   obtaining, as feature values for the plurality of images, a difference in the obtained number of pixels between the first image preceding a second image of the plurality of images and a third image of the plurality of images that follows the second image.

4. The method of claim 1, further comprising:
   determining a point of the feature value as a start point of the voice section if the feature value becomes greater than a first threshold value;
   setting a count value to 0 if the feature value becomes less than the first threshold value;
   increasing the count value over time from a point at which the feature value is less than the first threshold value to a point at which the feature value is greater than the first threshold value and less than a second threshold value; and
   determining as an end point of the voice section, a point at which the count value is greater than a preset gap.

5. A non-transitory computer-readable recording medium having recorded thereon a program for executing the method according to claim 1.

6. The method of claim 1, wherein the first image comprises the neighboring pixels and the reference pixel.

7. The method of claim 1, wherein a first neighboring pixel, of the neighboring pixels, is located outside of the area where the lips exist, the first neighboring pixel having a first neighboring pixel value.

8. The method of claim 1, further comprising:
   detecting, from a second image of the plurality of images, the pixels in the area where the lips exist;
   obtaining second feature values of movement of the lips in the area for the second image based on second variance values of differences between the reference pixel value of the reference pixel, which is located in the area where the lips exist, in the second image and pixel values of neighboring pixels located around the reference pixel in the second image; and
   determining the voice section from the first image and the second image based on first variance values and the second variance values.

9. The method of claim 8, wherein the first variance values and the second variance values are determined based on a variance histogram which indicates a number of reference pixels having a larger variance value than a threshold value.

10. A method of detecting a voice section, the method comprising:
    detecting, from a first image of a plurality of images, pixels in an area where lips exist;
    obtaining movement information of each of the pixels included in the area;
    dividing the area into divided regions which are symmetric to each other;
    obtaining a feature value of movement of the lips in the area for the first image based on differences between movement information of the divided regions that uses a reference pixel value of a reference pixel, which is located in the area where the lips exist, in the first image and pixel values of neighboring pixels located around the reference pixel in the first image; and
    determining the voice section based on the feature value for the first image,
    wherein the obtaining of the feature value comprises:
       obtaining an average pixel value of the reference pixel value and the pixel values of the neighboring pixels located around the reference pixel; and
       obtaining the feature value based on differences between the average pixel value and the pixel values for at least one of the reference pixel or the neighboring pixels.

11. The method of claim 10, further comprising:
    obtaining the movement information of each pixel by using an optical flow method.

12. A device for detecting a voice section, the device comprising:
    a transceiver configured to receive a plurality of images comprising a face; and
    a processor configured to:
       detect, from a first image of the plurality of images, pixels in an area where lips exist,
       obtain a feature value of movement of the lips in the area for the first image based on differences between a reference pixel value of a reference pixel, which is located in the area where the lips exist, in the first image and pixel values of neighboring pixels located around the reference pixel in the first image,
       detect the voice section from the first image based on the feature value, and
       perform voice recognition based on an audio signal corresponding to the detected voice section,
    wherein the processor is further configured to:
       obtain an average pixel value of the reference pixel value and the pixel values of the neighboring pixels located around the reference pixel, and
       obtain the feature value based on differences between the average pixel value and the pixel values for at least one of the reference pixel or the neighboring pixels.

13. The device of claim 12, wherein the processor is further configured to:

obtain a variance value of each of the pixels included in the area based on a difference between a representative value of each of the pixels in the area and the pixel values of the neighboring pixels located around each of the pixels, and obtain the feature value of the plurality of images based on the variance value of each of the pixels.

14. The device of claim 12, wherein the processor is further configured to:

obtain a number of pixels corresponding to a difference being greater than a preset threshold value for the plurality of images, and obtain, as feature values for the plurality of images, a difference in the obtained number of pixels between the first image preceding a second image of the plurality of images and a third image of the plurality of images following the second image.

15. The device of claim 12, wherein the processor is further configured to:

determine a point of the feature value as a start point of the voice section if the feature value becomes greater than a first threshold value, set a count value to 0 if the feature value becomes less than the first threshold value, increase the count value over time from a point at which the feature value is less than the first threshold value to a point at which the feature value is greater than the first threshold value and less than a second threshold value, and determine as an end point of the voice section, a point at which the count value is greater than a preset gap.

* * * * *